US010604109B2

(12) United States Patent
Tackett

(10) Patent No.: US 10,604,109 B2
(45) Date of Patent: Mar. 31, 2020

(54) CABLE REEL RESTRAINT DEVICE

(71) Applicant: Bell Helicopter Textron Inc., Fort Worth, TX (US)

(72) Inventor: Louis G. Tackett, Fort Worth, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 164 days.

(21) Appl. No.: 15/813,786

(22) Filed: Nov. 15, 2017

(65) Prior Publication Data

US 2019/0143934 A1 May 16, 2019

(51) Int. Cl.
*B60R 22/46* (2006.01)
*B60P 7/08* (2006.01)

(52) U.S. Cl.
CPC .......... *B60R 22/4619* (2013.01); *B60P 7/083* (2013.01); *B60P 7/0823* (2013.01); *B60P 7/0846* (2013.01); *B60P 7/0861* (2013.01); *B60P 7/0892* (2013.01); *B60P 7/0807* (2013.01)

(58) Field of Classification Search
CPC .... B60R 22/4619; B60P 7/0892; B60P 7/083; B60P 7/0807; B60P 7/0861; B60P 7/0823; B60P 7/0846
See application file for complete search history.

(56) References Cited

U.S. PATENT DOCUMENTS

| 5,042,159 A * | 8/1991 | Millen | B44D 3/38 242/375.3 |
|---|---|---|---|
| 5,542,798 A * | 8/1996 | Rawdon | B60P 7/083 24/68 CD |
| 6,405,683 B1 * | 6/2002 | Walter | A01K 27/004 119/772 |
| 6,609,275 B1 * | 8/2003 | Lin | B60P 7/0823 24/68 CD |
| 6,789,329 B1 * | 9/2004 | Hester | B44D 3/38 33/414 |
| 6,904,872 B2 * | 6/2005 | Muller | A01K 27/004 119/789 |
| 6,925,967 B1 * | 8/2005 | Woodruff | A01K 27/004 119/712 |
| 7,575,224 B1 * | 8/2009 | Madland | B66D 3/04 24/71 ST |
| 9,193,295 B2 * | 11/2015 | Breeden | B60P 7/0846 |

(Continued)

*Primary Examiner* — Robert Sandy
*Assistant Examiner* — Louis A Mercado
(74) *Attorney, Agent, or Firm* — Patent Capital Group

(57) ABSTRACT

A cable reel restraint device comprises a cable reel, a retractable cable, first and second springs, first and second attachment interfaces, and a preload selection control. The retractable cable is configured to extend from and retract onto the cable reel. The first spring is configured to exert force for preloading the second spring, and the second spring is configured to exert force for retracting the retractable cable. The first attachment interface is coupled to the cable reel by a first spherical bearing, and the second attachment interface is coupled to the retractable cable by a second spherical bearing. Moreover, the first and second attachment interfaces are configured for being fastened to first and second attachment points. The preload selection control is configured to select a particular preload magnitude and cause the first spring to preload the second spring with a load of the particular preload magnitude.

18 Claims, 8 Drawing Sheets

(56) References Cited

U.S. PATENT DOCUMENTS

| | | | |
|---|---|---|---|
| 9,796,322 B1* | 10/2017 | Miller | B60P 7/0823 |
| 9,796,323 B1* | 10/2017 | Anderson | B60P 7/083 |
| 9,862,300 B1* | 1/2018 | Anderson | B60P 7/0846 |
| 2010/0205784 A1* | 8/2010 | Yang | B25B 25/00 |
| | | | 24/115 H |
| 2012/0233824 A1* | 9/2012 | Breeden | B60P 7/083 |
| | | | 24/68 CD |
| 2013/0161440 A1* | 6/2013 | Patterson | B60P 7/083 |
| | | | 242/412.1 |
| 2018/0326892 A1* | 11/2018 | Plahuta | B60P 7/083 |

* cited by examiner

CABLE REEL RESTRAINT DEVICE

TECHNICAL FIELD

This disclosure relates generally to tie-down and restraint mechanisms, and more particularly, though not exclusively, to a cable reel restraint device.

BACKGROUND

Aircraft tie-down and restraint typically involves the use of multiple chains with associated fasteners, ratchets, and tension bars. These tie-down mechanisms can be difficult to set up, remove, and transport, however, as the chains are typically long and heavy, cumbersome to carry, and susceptible to tangling. Moreover, the associated fasteners, ratchets, and tension bars further complicate the usability and transportability of these tie-down mechanisms. In addition, the preload or tension of each chain must be configured individually, thus hindering the ability to uniformly apply the same preload to all chains. Further, the interface of the chains with the associated fasteners causes loads to be offset and produces local moments, which increases the requisite size and weight of the underlying components used to implement these tie-down mechanisms.

SUMMARY

According to one aspect of the present disclosure, a cable reel restraint device comprises a cable reel, a retractable cable, first and second springs, first and second attachment interfaces, and a preload selection control. The retractable cable is configured to extend from and retract onto the cable reel. The first spring is configured to exert force for preloading the second spring, and the second spring is configured to exert force for retracting the retractable cable. The first attachment interface is coupled to the cable reel by a first spherical bearing, and the second attachment interface is coupled to the retractable cable by a second spherical bearing. Moreover, the first and second attachment interfaces are configured for being fastened to first and second attachment points. The preload selection control is configured to select a particular preload magnitude and cause the first spring to preload the second spring with a load of the particular preload magnitude.

DETAILED DESCRIPTION

Figure 1A:
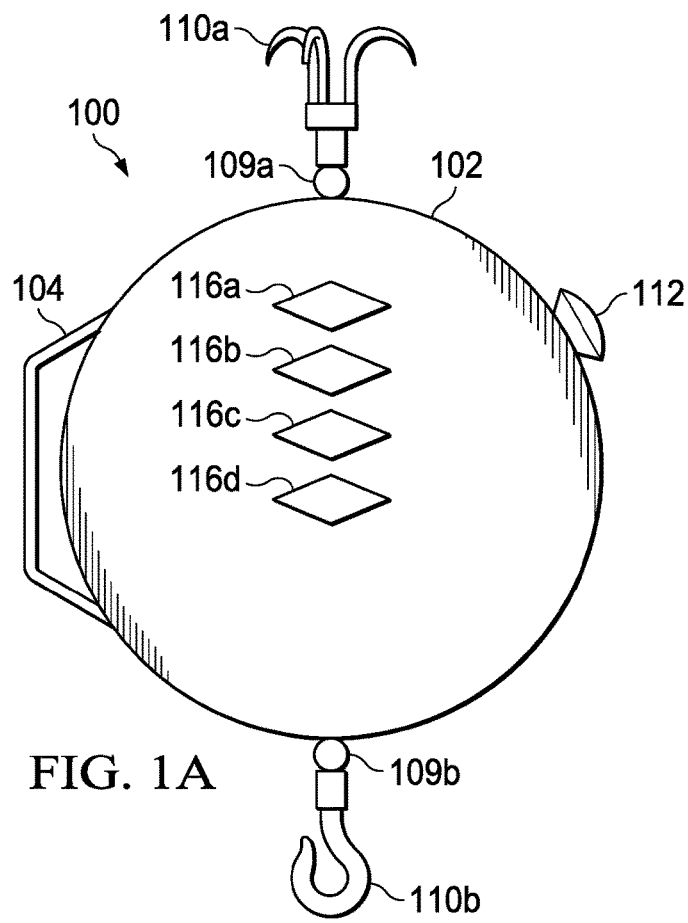
FIGS. 1A-D illustrate an example embodiment of a cable reel restraint device.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIGS. 1A-D illustrate an example embodiment of a cable reel restraint device 100. Restraint device 100 can be used for tie-down and restraint of objects, such as aircraft, vehicles, vessels, and/or cargo, among other examples. In some embodiments, for example, restraint device 100 could be used for mooring and securing of aircraft and cargo, such as tie-down of a helicopter and/or its associated cargo.

Existing aircraft tie-down and restraint mechanisms typically involve multiple chains with associated fasteners, ratchets, and tension bars. These existing tie-down mechanisms can be difficult to set up, remove, and transport, however, as the chains are typically lengthy (e.g., 20-30 feet long in some cases), heavy, cumbersome to carry, and susceptible to tangling. Moreover, the associated fasteners, ratchets, and tension bars add to the complexity of these existing tie-down mechanisms, thus further hindering their usability and transportability. In addition, the preload or tension of each chain must be configured individually (e.g., using an associated ratchet), thus hindering the ability to uniformly apply the same preload to all chains. Further, the interface of the chains with their associated fasteners causes loads to be offset and produces local moments, which increases the requisite size and weight of the underlying components used to implement these existing tie-down mechanisms.

Accordingly, this disclosure describes various embodiments of a cable reel restraint device 100 designed to alleviate the drawbacks of existing tie-down and restraint mechanisms. In some embodiments, for example, restraint device 100 may include a cable reel 102 with one or more retractable cables 105, along with a plurality of attachment interfaces 110a,b that can be fastened to multiple attachment points (e.g., aircraft hardpoints on one end and ground or deck hardpoints on the other end). Moreover, restraint device 100 includes preload selection controls 116a-d that can be used to preload the device to produce the desired amount of tension, thus eliminating the need for a ratcheting mechanism, and further allowing multiple restraint devices 100 to be uniformly configured with the same preload. Further, in some embodiments, restraint device 100 may also include a handle 104 positioned externally on cable reel 102 to allow restraint device 100 to be carried or transported easily. In this manner, restraint device 100 can be designed as a single assembly that is portable, easy to carry and store (e.g., with the cable 105 retracted within the device 100), easy to use, and flexible for use in many contexts (e.g., tie-down of aircraft, vehicles, vessels, and/or cargo).

Figure 1B:
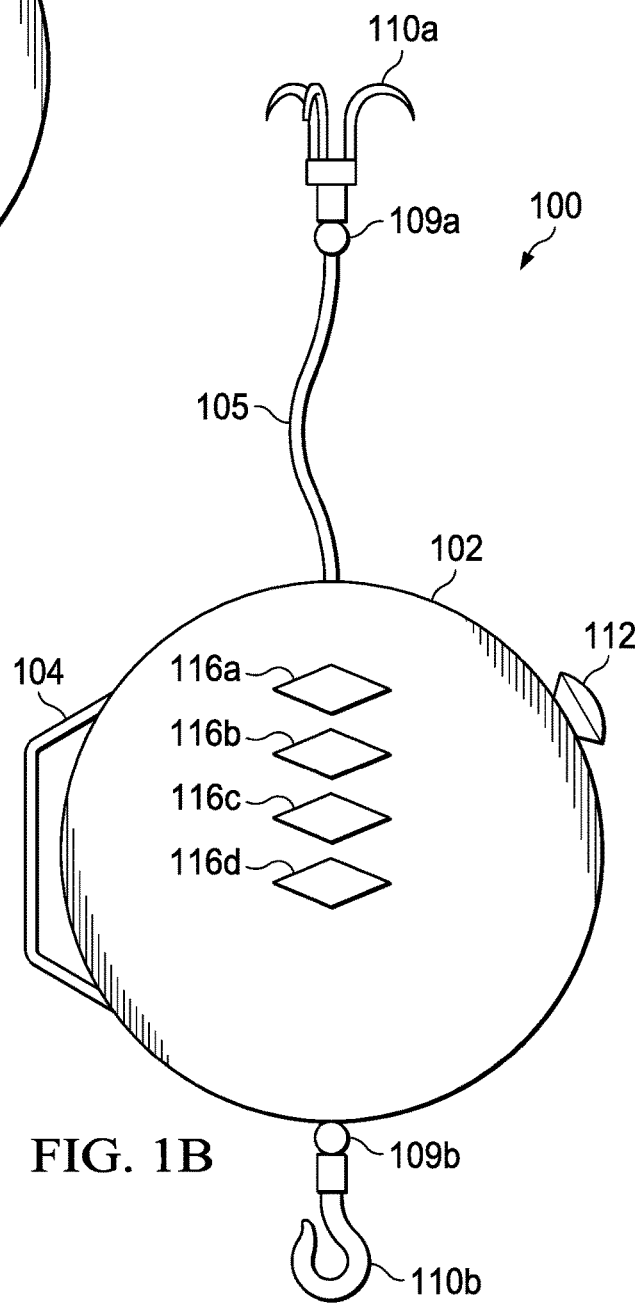
Figure 1C:
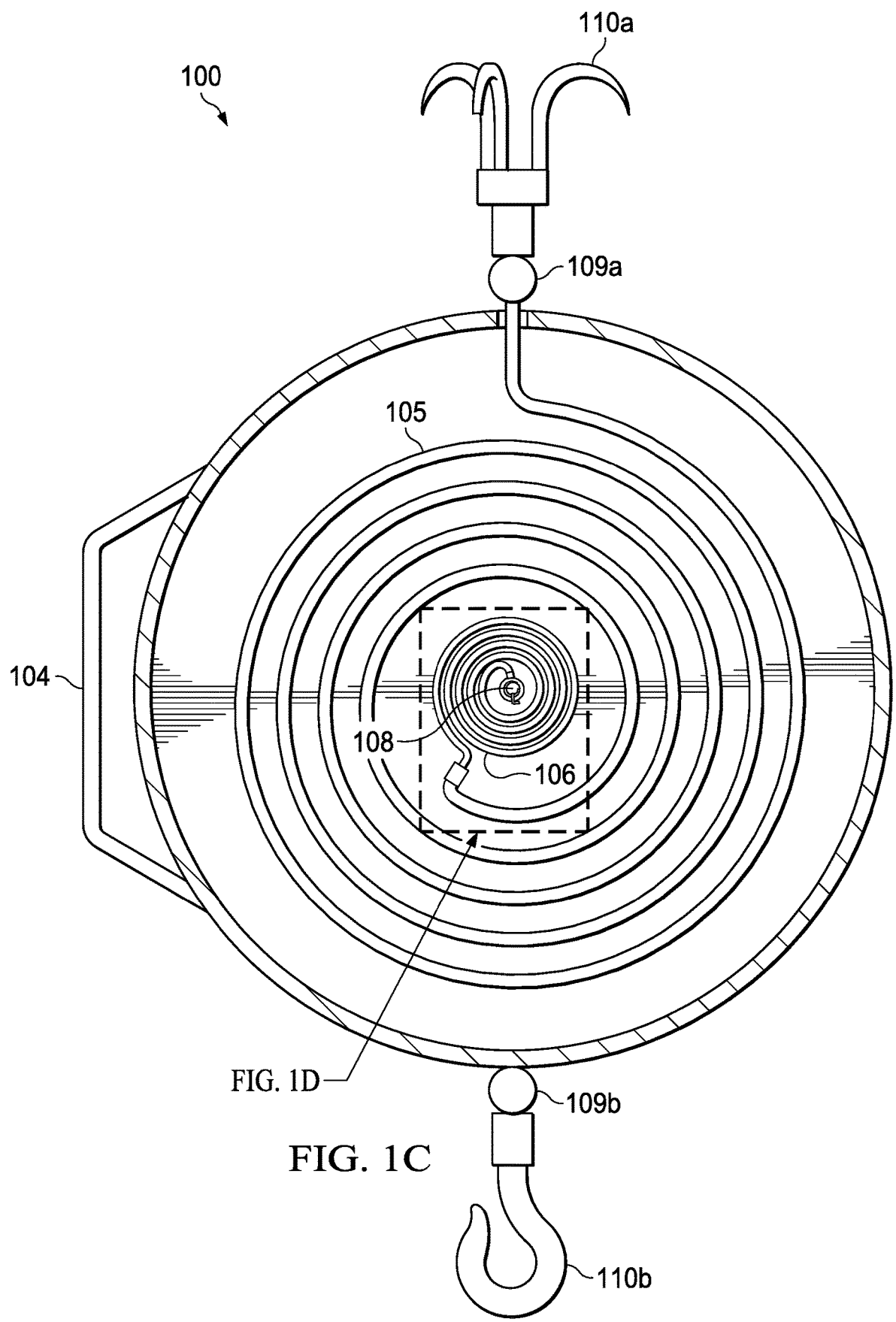
Figure 1D:
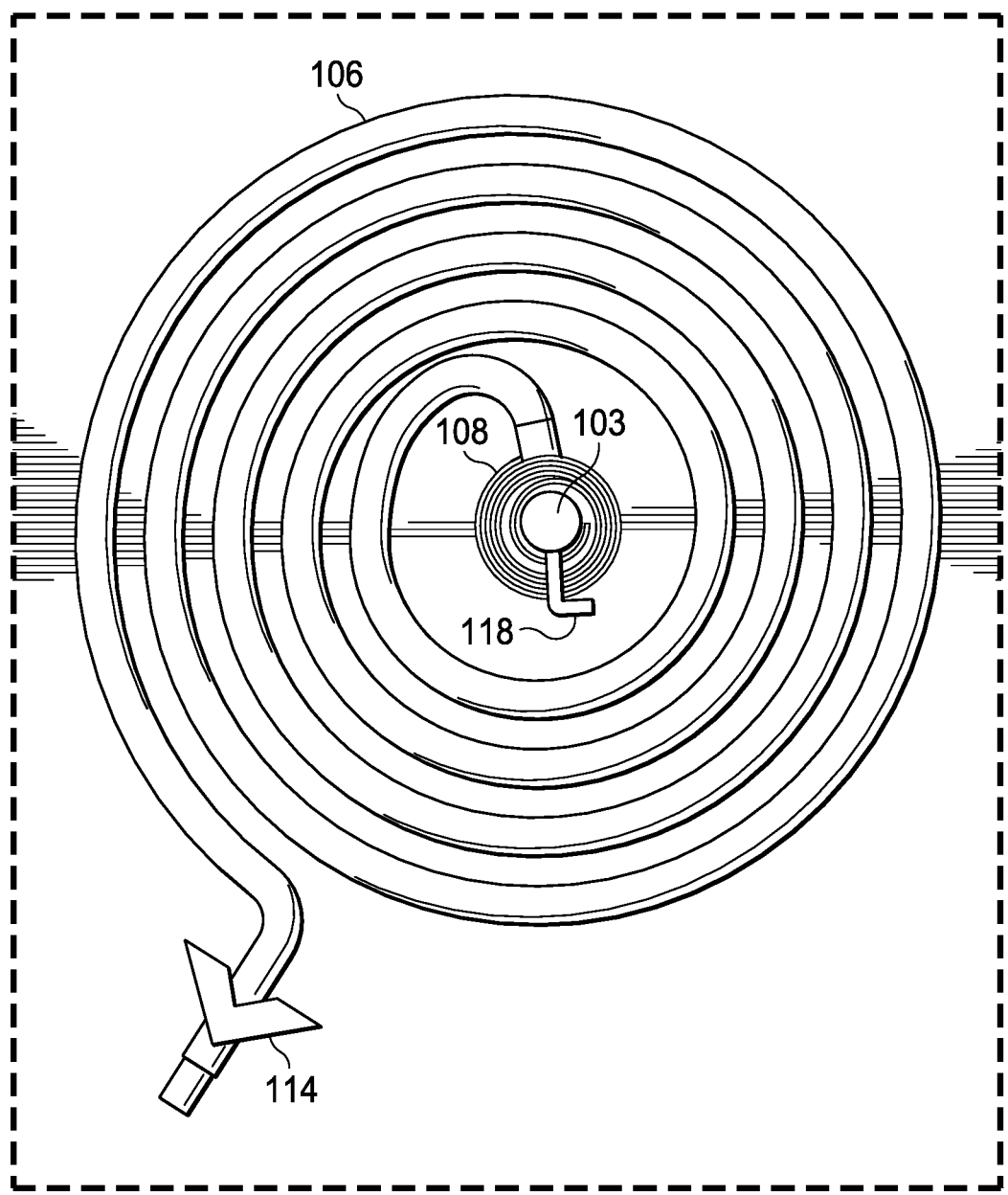

An example embodiment of cable reel restraint device 100 is shown in FIGS. 1A-D. In particular, FIG. 1A shows restraint device 100 in a configuration with cable 105 retracted within cable reel 102 (and therefore cable 105 is not visible); FIG. 1B shows restraint device 100 in a configuration with cable 105 partially extended from cable reel 102; FIG. 1C shows restraint device 100 with a transparent view of its internal components (e.g., cable 105, retraction spring 106, preload spring 108); and FIG. 1D shows a close-up view of certain internal components of restraint device 100 (e.g., retraction spring 106, preload spring 108, retraction lock 114, preload lock 118).

In the illustrated embodiment, restraint device 100 includes a cable reel 102, which houses a retractable cable 105 that can be extended from and retracted onto cable reel 102, as described further below. Moreover, restraint device 100 includes multiple attachment interfaces 110a,b that can be used to fasten or attach the device to multiple attachment points. In the illustrated embodiment, for example, attachment interfaces 110a,b are hook-based attachment interfaces. For example, attachment interface 110a is a multi-pronged hook or claw (e.g., capable of attachment to multiple interfaces separately or simultaneously), while attachment interface 110b is a single-pronged hook. Moreover, attachment interfaces 110a,b are coupled to different portions of restraint device 100 using monoballs 109a,b, which are pivoting spherical bearings. For example, attachment interface 110a is coupled to the end of retractable cable 105 via monoball 109a, while attachment interface 110b is coupled to the external housing of cable reel 102 via monoball 109b. In this manner, monoballs 109a,b allow attachment interfaces 110a,b to pivot, thus facilitating attachment to different attachment points at varying angles (e.g., aircraft and ground hardpoints positioned at a variety of angles), while also enabling the load on cable 105 to align itself along a line of action.

Moreover, retractable cable 105 is coupled to a retraction spring 106 within cable reel 102, which is configured to exert a force on cable 105 in order to facilitate extension and retraction of cable 105 on cable reel 102. In some embodiments, for example, cable 105 may be coiled around a spool 103 within cable reel 102, with one end of cable 105 coupled to retraction spring 106 within cable reel 102, and the other end of cable 105 extending outward from cable reel 102. In this manner, cable 105 can be extended from cable reel 102 by exerting an opposing force on cable 105 that exceeds the force of retraction spring 106 (e.g., by pulling on cable 105), and once the opposing force is released, retraction spring 106 will subsequently cause cable 105 to retract back onto cable reel 102 (e.g., by exerting a torsional force on cable 105).

Further, a retraction lock control 112 (e.g., a safety switch or button) is positioned externally on cable reel 102, and can be pressed or otherwise activated in order to prevent cable 105 from retracting back onto cable reel 102. In some embodiments, for example, retraction lock control 112 may use a pushrod (not shown) to activate a locking mechanism 114 within cable reel 102 that prevents cable 105 from retracting (e.g., by inhibiting retraction spring 106 from exerting the requisite force on cable 105). In this manner, retraction lock control 112 can be used as a safety locking mechanism to prevent cable 105 from retracting unexpectedly.

A preload spring 108 is also housed within cable reel 102. In the illustrated embodiment, for example, preload spring 108 is coiled around spool 103 and is further coupled to retraction spring 106. In this manner, preload spring 108 is capable of exerting a force on retraction spring 106 in order to preload retraction spring 106 with a desired preload magnitude, thus causing retraction spring 106 to produce an appropriate amount of tension on cable 105. For example, in the illustrated embodiment, preload selection controls 116a-d are positioned externally on cable reel 102. Moreover, preload selection controls 116a-d may be preset preload settings that each correspond to a different preload magnitude. In some embodiments, for example, preload selection controls 116a-d may include buttons, switches, and/or toggles that can be pressed or otherwise selected in order to preload retraction spring 106 with a desired preload magnitude. For example, when preload selection controls 116a-d are pressed or otherwise selected, preload spring 108 exerts a force on retraction spring 106 in order to preload retraction spring 106 with the desired preload magnitude. In some embodiments, for example, each preload selection control 116a-d may use a pushrod (not shown) to wind or twist preload spring 108 by an appropriate amount, thus causing preload spring 108 to exert the requisite amount of force for preloading retraction spring 106 with the desired load magnitude. In some embodiments, preload selection controls 116a-d may further activate a preload locking mechanism 118 within cable reel 102 in order to maintain the desired preload magnitude (e.g., by locking preload spring 108 in the selected configuration). In this manner, preload selection controls 116a-d allow restraint device 100 to be easily configured with a desired preload magnitude in order to produce an appropriate amount of tension in cable 105. Moreover, when multiple restraint devices 100 are used together (e.g., for aircraft tie-down), preload selection controls 116a-d allow the restraint devices 100 to be uniformly configured with the same preload.

As an example, when using restraint device 100 for aircraft tie-down, claw interface 110a can be attached or fastened to an aircraft hardpoint, while hook interface 110b can be attached or fastened to a ground or deck hardpoint. Moreover, in some cases, multiple restraint devices 100 may be used in this manner in order to secure different portions of the aircraft to different portions of the ground. In addition, the restraint devices 100 may be uniformly configured with the same preload by selecting the appropriate preload selection control 116a-d on each restraint device 100.

It should be appreciated that restraint device 100 of FIGS. 1A-D is merely illustrative of a variety of possible embodiments that can be implemented based on the teachings of this disclosure. Moreover, the described embodiment of restraint device 100 can be tailored for use in any context, including tie-down or restraint for aircraft, vehicles, vessels, cargo, manufacturing, delivery, and so forth. In various embodiments, for example, the underlying components of restraint device 100 can be scaled or modified to fit the needs of a particular application or use case. For example, the characteristics of retractable cable 105 may vary, such as its length, thickness, and/or underlying material(s), along with the number of retractable cables 105 that are incorporated into restraint device 100. The size, type, and/or number of attachment interfaces 110 may also vary. For example, attachment interfaces 110 may be sized appropriately based on the strength of cable 105, and/or may be standardized for attachment in particular contexts, such as ground, ship, rail, or air transport. In addition, attachment interfaces 110 may be implemented using any suitable type of attachment mechanism, interface, fitting, or fastener, such as clasps, buckles, latches, clips, straps, belts, clamps, and so forth. Further, in some embodiments, the functionality of monoballs 109 may alternatively be implemented using any other suitable type of spherical or pivot-based bearing. Moreover, retraction spring 106 and preload spring 108 may be respectively implemented using any suitable type of spring tailored with appropriate properties, such as a torsion spring, tension spring, rotational spring, and so forth. Further, the number of springs 106, 108 may also vary depending on the number of retractable cables 105 implemented by restraint device 100.

In some embodiments, for example, retractable cable 105 may be implemented with a length that is sufficient for a variety of applications, such as roughly 15-20 feet. Moreover, for aircraft tie-down applications, retractable cable 105 may be made of a material designed to support loads of up to 10,000 pounds (lbs) (e.g., steel and/or other metals), although the material and strength of cable 105 may vary for other applications. Finally, preload selection controls 116a-d may be configured to support particular preset load magnitudes that are suitable for a particular application. For example, for aircraft tie-down, preload selection controls 116a-d may be configured to support preload magnitudes of 300 lbs, 400 lbs, 500 lbs, and 600 lbs. For smaller scale applications, however, preload selection controls 116a-d may be configured to support a smaller range of preload magnitudes, such as 30 lbs, 40 lbs, 50 lbs, and 60 lbs. The particular preload magnitudes supported by preload selection controls 116a-d, however, may be tailored for different applications and use cases.

Additional embodiments and examples are described below with more particular reference to the remaining FIGURES.

Figure 2:
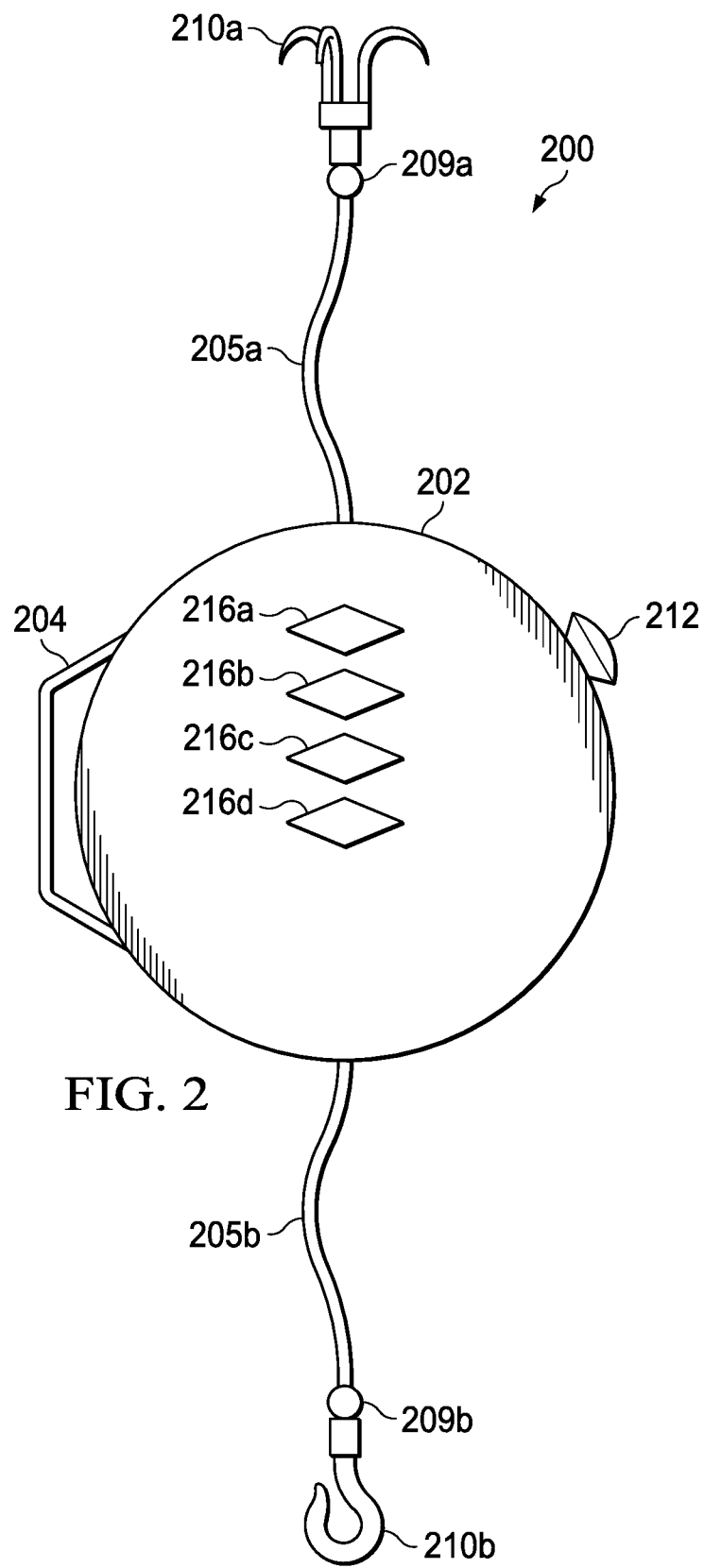
FIGS. 2A-2C illustrate an example embodiment of a cable reel restraint device with multiple retraction cables.

FIGS. 2A-2C illustrate an example embodiment of a cable reel restraint device 200 with multiple retraction cables 205a,b. In some embodiments, for example, cable reel restraint device 200 may be implemented in a similar manner as described above for cable reel restraint device 100 of FIGS. 1A-D, but with certain modifications in order to support multiple retractable cables 205a,b, as described further below.

In the illustrated embodiment, for example, restraint device 200 includes cable reel 202, handle 204, cables 205a,b, monoballs 209a,b, attachment interfaces 210a,b, retraction lock control 212, and preload selection controls 216a-d. In some embodiments, the components of restraint device 200 may be similar to components with similar reference numerals from restraint device 100 of FIGS. 1A-D. However, while restraint device 100 includes a single retractable cable 105, restraint device 200 includes multiple retractable cables 205a,b. Accordingly, the ends of the retractable cables 205a,b of restraint device 200 are respectively coupled to attachment interfaces 210a,b using spherical bearings or monoballs 209a,b. For example, the end of retractable cable 205a is coupled to attachment interface 210a using monoball 209a, while the end of retractable cable 205b is coupled to attachment interface 210b using monoball 209b.

Moreover, in order to provide retraction and preload capabilities for both retractable cables 205a,b, restraint device 200 may include a separate set of retraction and preload springs (not shown) for each cable 205a,b. For example, as described above in connection with restraint device 100 of FIGS. 1A-D, the retraction and preload capabilities of retractable cable 105 are provided using a retraction spring 106 and a preload spring 108. Accordingly, in order to provide retraction and preload capabilities for both retractable cables 205a,b of restraint device 200, restraint device 200 may include a first set of retraction and preload springs for the first retractable cable 205a, and a second set of retraction and preload springs for the second retractable cable 205b. In some embodiments, for example, each set of cable and springs may be positioned or stacked adjacently within cable reel 202. For example, the first retractable cable 205a and its associated springs may be separate from, but positioned adjacently to, the second retractable cable 205b and its associated springs. In other embodiments, however, restraint device 200 may be modified in a similar manner to include retraction and preload capabilities for any number of cables 205. FIGS. 2B and 2C illustrate a close up view of certain internal components of restraint device 200 (e.g., spool 203, retraction springs 206a,b, preload spring 208a,b, retraction locks 214a,b, preload locks 218a,b).

Figure 3A:
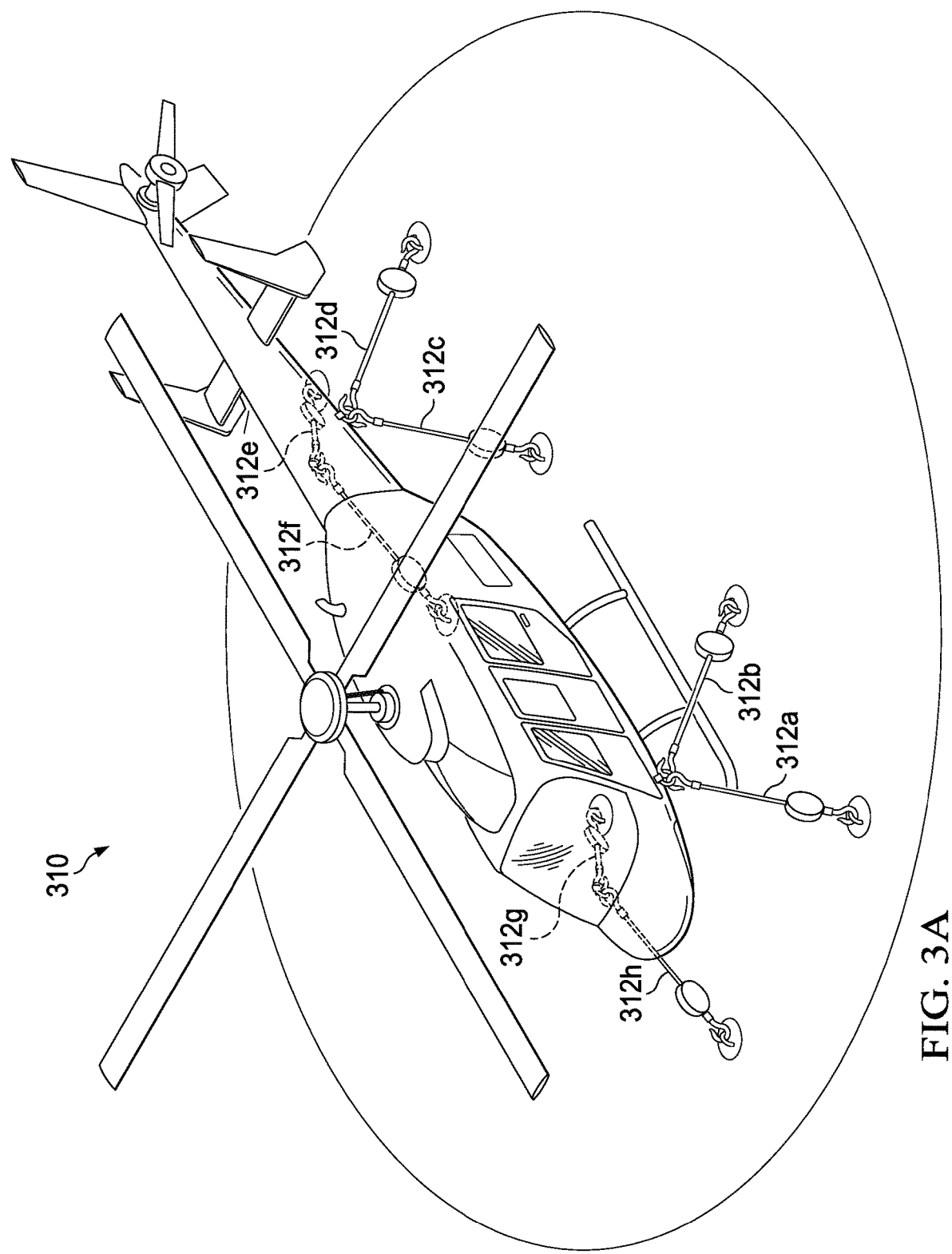
FIGS. 3A-C illustrate example use cases of cable reel restraint devices.
Figure 3B:
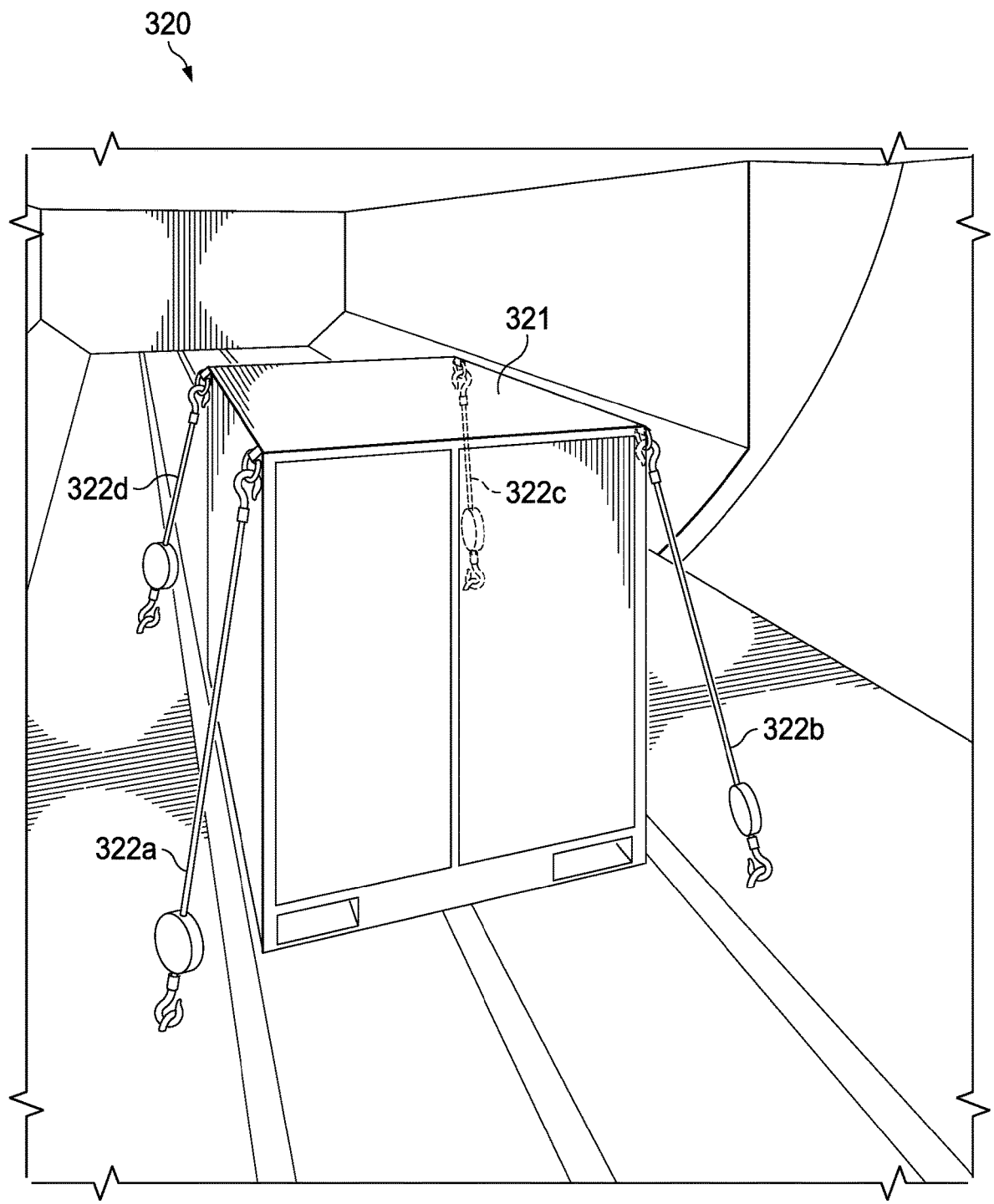
Figure 3C:
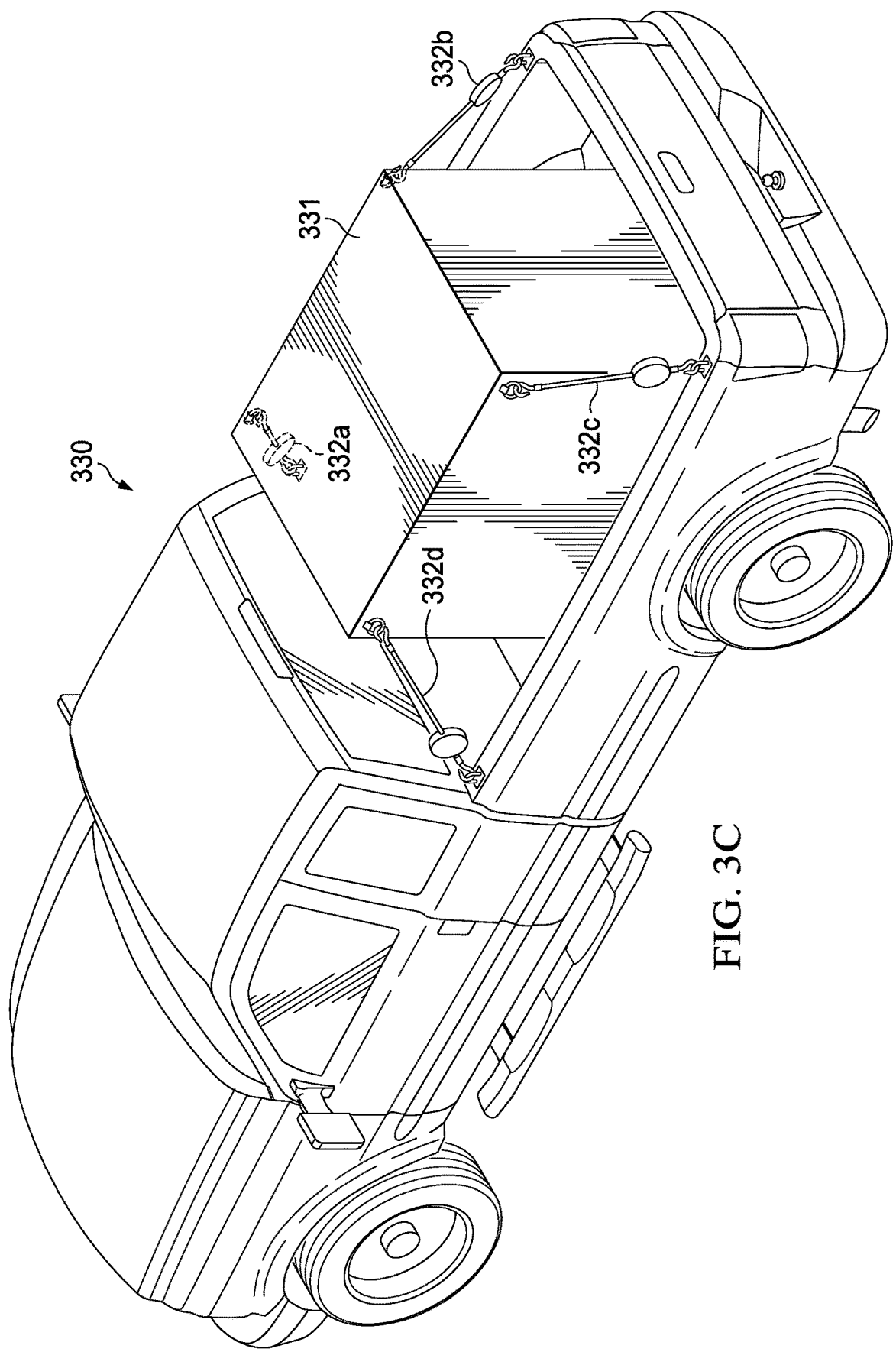

FIGS. 3A-C illustrate example use cases of cable reel restraint devices. In some embodiments, for example, the use cases of FIGS. 3A-C may use cable reel restraint devices similar to those illustrated and described in connection with FIGS. 1A-D and 2.

FIG. 3A illustrates an example use case of mooring an aircraft 310 using cable reel restraint devices 312a-h. In the illustrated example, aircraft 310 is moored using multiple cable reel restraint devices 312a-h in order to secure different portions of the aircraft to different portions of the ground. For example, each restraint device 312a-h includes multiple attachment interfaces that are respectively fastened to a particular hardpoint on aircraft 310 and a particular hardpoint on the ground or deck. Moreover, in some embodiments, restraint devices 312a-h may be uniformly preloaded with loads of the same magnitude using preload selection controls associated with each restraint device. Finally, while aircraft 310 is a rotorcraft in the illustrated example, any type of aircraft can be moored in a similar manner, including helicopters, tiltrotor aircraft, fixed-wing airplanes, hybrid aircraft, unmanned aircraft or drones, gyrocopters, and so forth.

FIG. 3B illustrates an example use case of securing cargo 321 in an aircraft cargo bay 320 using cable reel restraint devices 322a-d. In the illustrated example, cargo 321 is secured or restrained using multiple cable reel restraint devices 322a-d in order to secure the cargo 321 in multiple places. Moreover, in some embodiments, restraint devices 322a-d may be uniformly preloaded with loads of the same magnitude using preload selection controls associated with each restraint device.

FIG. 3C illustrates an example use case of securing cargo 331 on a vehicle 330 using cable reel restraint devices 332a-d. In the illustrated example, cargo 331 is secured or restrained using multiple cable reel restraint devices 332a-d in order to secure the cargo 331 in multiple places. Moreover, in some embodiments, restraint devices 332a-d may be uniformly preloaded with loads of the same magnitude using preload selection controls associated with each restraint device. Finally, while vehicle 330 is a truck in the illustrated example, cargo can be secured in a similar manner in any type of vehicle, such as cars or trucks, among other examples.

Figure 4:
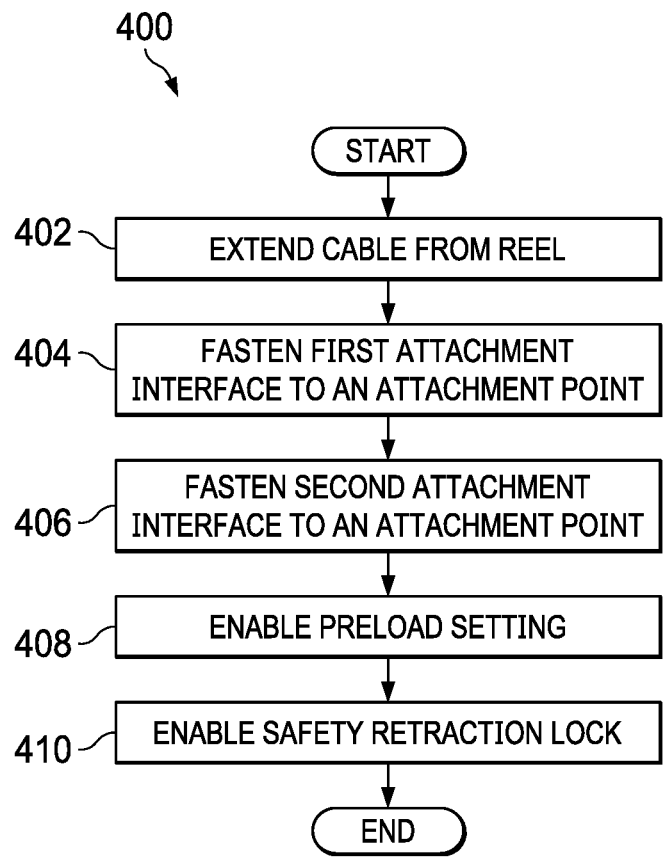
FIG. 4 illustrates a flowchart for an example setup process associated with a cable reel restraint device.

FIG. 4 illustrates a flowchart 400 for an example setup process associated with a cable reel restraint device. In some embodiments, for example, flowchart 400 may be used to set up the cable reel restraint devices of FIGS. 1A-D and 2.

The flowchart may begin at block 402 by extending a retractable cable from the restraint device. In some embodiments, for example, the restraint device may include one or more retractable cables coiled around a cable reel, which are capable of being extended from and retracted onto the cable reel.

The flowchart may then proceed to block 404 to fasten a first attachment interface of the restraint device to a first attachment point. For example, the restraint device may include a plurality of attachment interfaces. Moreover, in some embodiments, the attachment interfaces may be positioned on the end of each retractable cable and/or on the housing of the restraint device. Accordingly, the restraint device may be fastened to a first attachment point using one of the attachment interfaces. The flowchart may then proceed to block 406 to fasten a second attachment interface of the restraint device to a second attachment point.

The flowchart may then proceed to block 408 to select or enable a particular preload setting supported by the restraint device. In some embodiments, for example, the restraint device may include one or more preload selection controls positioned externally on the device, and the preload selection controls may allow a particular preload magnitude to be selected for preloading the restraint device. In this manner, the preload selection controls allow the restraint device to be easily configured with a desired preload magnitude in order to produce an appropriate amount of tension in the retractable cable(s). Moreover, when multiple restraint devices are used together (e.g., for aircraft or cargo tie-down), the preload selection controls allow the restraint devices to be uniformly configured with the same preload.

The flowchart may then proceed to block 410 to enable the safety retraction lock of the restraint device. In some embodiments for example, the restraint device may include a retraction lock control (e.g., a safety switch or button) positioned externally on the device, which can be pressed or otherwise activated in order to prevent the retractable cable(s) from retracting back onto the cable reel of the restraint device. In this manner, the retraction lock control can be used as a safety locking mechanism to prevent the cable(s) from retracting unexpectedly.

At this point, the flowchart may be complete. In some embodiments, however, the flowchart may restart and/or certain blocks may be repeated.

Figure 5:
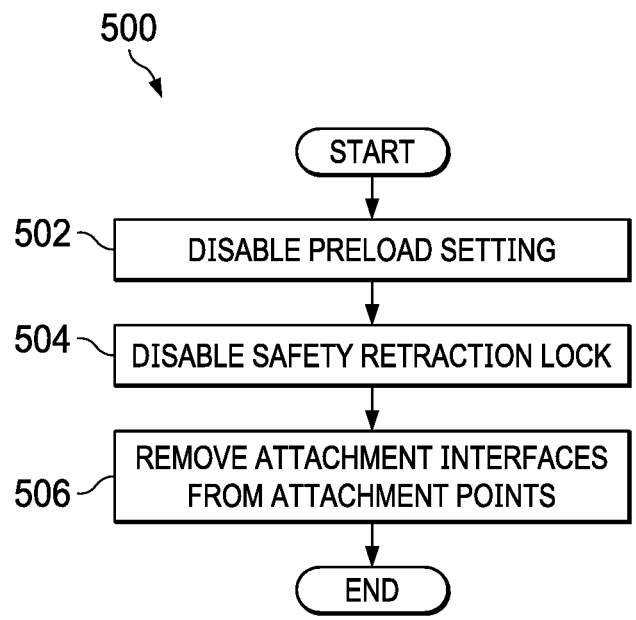
FIG. 5 illustrates a flowchart for an example removal process associated with a cable reel restraint device.

FIG. 5 illustrates a flowchart 500 for an example removal process associated with a cable reel restraint device. In some embodiments, for example, flowchart 500 may be used for removal or takedown of the cable reel restraint devices of FIGS. 1A-D and 2.

The flowchart may begin at block 502 by disabling the preload setting that was previously enabled during setup of the restraint device. The flowchart may then proceed to block 504 to disable the safety retraction lock that was previously enabled during setup of the restraint device. The flowchart may then proceed to block 506 to remove the attachment interfaces of the restraint device from their respective attachment points. In this manner, the retractable cable(s) of the restraint device will then retract back onto the reel of the restraint device.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A cable reel restraint device, comprising:
a cable reel;
a retractable cable configured to be extended from and retracted onto the cable reel;
a first spring and a second spring, wherein the first spring is configured to exert force on the second spring to preload the second spring, and wherein the second spring is configured to exert force on the retractable cable to cause retraction of the retractable cable;

a first attachment interface coupled to the cable reel by a first spherical bearing, wherein the first attachment interface is configured for fastening the cable reel to a first attachment point; and a second attachment interface coupled to the retractable cable by a second spherical bearing, wherein the second attachment interface is configured for fastening the retractable cable to a second attachment point;

wherein the first spring is configured to preload the second spring with a load of a particular preload magnitude.

2. The cable reel restraint device of claim 1, wherein:
the cable reel comprises a spool; and
the retractable cable is coupled to the second spring, the second spring is coupled to the first spring, and the first spring is coupled to the spool.

3. The cable reel restraint device of claim 1, further comprising a retraction lock configured to prevent the retractable cable from retracting.

4. The cable reel restraint device of claim 1, wherein at least one of the first attachment interface and the second attachment interface comprises a hook.

5. The cable reel restraint device of claim 4, wherein the hook comprises a plurality of prongs.

6. The cable reel restraint device of claim 1, wherein at least one of the first attachment interface and the second attachment interface comprises a clasp.

7. The cable reel restraint device of claim 1, wherein at least one of the first spherical bearing and the second spherical bearing comprises a monoball.

8. The cable reel restraint device of claim 1, further comprising a handle coupled to the cable reel.

9. The cable reel restraint device of claim 1, wherein at least one of the first spring and the second spring comprises a torsion spring.

10. The cable reel restraint device of claim 1, wherein the retractable cable further comprises a steel cable.

11. A cable reel restraint device, comprising:
a cable reel;
a plurality of retractable cables, wherein the plurality of retractable cables comprises a first cable and a second cable;
a first set of springs associated with the first cable, wherein the first set of springs comprises a first spring and a second spring, wherein the first spring is configured to exert force on the second spring to preload the second spring, and wherein the second spring is configured to exert force on the first cable to cause retraction of the first cable;

a second set of springs associated with the second cable, wherein the second set of springs comprises a third spring and a fourth spring, wherein the third spring is configured to exert force on the fourth spring to preload the fourth spring, and wherein the fourth spring is configured to exert force on the second cable to cause retraction of the second cable;

a first attachment interface coupled to the first cable, wherein the first attachment interface is configured for fastening the first cable to a first attachment point; and a second attachment interface coupled to the second cable, wherein the second attachment interface is configured for fastening the second cable to a second attachment point;

wherein the first spring is configured to preload the second spring to a first preload magnitude and the third spring is configured to preload the fourth spring to a second preload magnitude.

12. The cable reel restraint device of claim 11, wherein:
the cable reel comprises a spool;
the first cable is coupled to the second spring, the second spring is coupled to the first spring, and the first spring is coupled to the spool; and
the second cable is coupled to the fourth spring, the fourth spring is coupled to the third spring, and the third spring is coupled to the spool.

13. The cable reel restraint device of claim 11, wherein the first attachment interface is coupled to the first cable by a first spherical bearing, and wherein the second attachment interface is coupled to the second cable by a second spherical bearing.

14. The cable reel restraint device of claim 13, wherein at least one of the first spherical bearing and the second spherical bearing comprises a monoball.

15. The cable reel restraint device of claim 11, further comprising a retraction lock configured to prevent the plurality of retractable cables from retracting.

16. The cable reel restraint device of claim 11, wherein at least one of the first attachment interface and the second attachment interface comprises a hook.

17. The cable reel restraint device of claim 16, wherein the hook comprises a plurality of prongs.

18. The cable reel restraint device of claim 11, further comprising a handle coupled to the cable reel.

* * * * *